(12) United States Patent
Strachota et al.

(10) Patent No.: US 9,301,017 B2
(45) Date of Patent: Mar. 29, 2016

(54) APPARATUS AND METHOD FOR MANAGING SIGNALS PROVIDED TO MULTIPLE DISPLAY DEVICES

(71) Applicant: THOMSON LICENSING, Issy de Moulineaux (FR)

(72) Inventors: Douglas Paul Strachota, Indianapolis, IN (US); Brian William Moore, Washington, DC (US)

(73) Assignee: Thomson Licensing, Issy les Moulineaux (FR)

( * ) Notice: Subject to any disclaimer, the term of this patent is extended or adjusted under 35 U.S.C. 154(b) by 636 days.

(21) Appl. No.: 13/723,988

(22) Filed: Dec. 21, 2012

(65) Prior Publication Data

US 2014/0181867 A1    Jun. 26, 2014

(51) Int. Cl.

| | | |
|---|---|---|
| G06F 3/00 | (2006.01) |
| G06F 13/00 | (2006.01) |
| H04N 5/445 | (2011.01) |
| H04N 7/18 | (2006.01) |
| H04N 21/482 | (2011.01) |
| H04N 21/41 | (2011.01) |
| H04N 21/436 | (2011.01) |
| H04N 21/438 | (2011.01) |
| H04N 21/442 | (2011.01) |
| H04H 20/10 | (2008.01) |
| H04H 20/63 | (2008.01) |

(52) U.S. Cl.
CPC ............ H04N 21/482 (2013.01); H04H 20/10 (2013.01); H04H 20/63 (2013.01); H04N 21/4122 (2013.01); H04N 21/4382 (2013.01); H04N 21/4383 (2013.01); H04N 21/43615 (2013.01); H04N 21/442 (2013.01)

(58) Field of Classification Search
None
See application file for complete search history.

(56) References Cited

U.S. PATENT DOCUMENTS

| 8,266,657 | B2 | 9/2012 | Margulis |
|---|---|---|---|
| 2006/0035610 | A1* | 2/2006 | Potrebic ..................... 455/178.1 |
| 2009/0136231 | A1 | 5/2009 | Lai |
| 2009/0282437 | A1* | 11/2009 | Malec et al. .................... 725/40 |
| 2013/0133010 | A1* | 5/2013 | Chen ............................. 725/61 |

FOREIGN PATENT DOCUMENTS

| JP | 200955517 | 3/2009 |
|---|---|---|
| WO | WO 2012173656 A1 * | 12/2012 |

OTHER PUBLICATIONS

Ramsey, "Ceton Offers Simple Solution to Manage Multiple TV Screens," Cable.tmcnet.com, Cable Spotlight, Oct. 30, 2012, pp. 1-2.
Cinemar, "Sports Bar Audio and Video Control Packages available from Cinemar," www.cinemarsolutions.com/sportsbar.php.

* cited by examiner

*Primary Examiner* — Nathan Flynn
*Assistant Examiner* — William J Kim
(74) *Attorney, Agent, or Firm* — Robert D. Shedd; Vincent E. Duffy; Michael A. Pugel

(57) ABSTRACT

A method, apparatus, and user interface for providing operational status for multiple communication networks is described. The embodiments include receiving a request to change a program being provided on a first device in the plurality of devices, determining if the requested change requires changing the program provided to at least one second device in the plurality of devices, and outputting or displaying a list of programs currently provided to a subset of the plurality of devices if the requested change requires changing the program to the at least one second device, the subset of devices including the first device and the at least one second device.

27 Claims, 12 Drawing Sheets

APPARATUS AND METHOD FOR MANAGING SIGNALS PROVIDED TO MULTIPLE DISPLAY DEVICES

TECHNICAL FIELD OF THE INVENTION

The present embodiments relate to managing signals management provided to multiple display devices. More specifically, the present embodiments relate to a mechanism and user interface for managing the tuning and delivering of video signals to a plurality of video display devices in an establishment.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

There are many environments where multiple video display devices (e.g., televisions (TVs), monitors, and computers) exist but only a few tuners/receivers are in place to send audio and video to the display devices. Sports bars are a prime example of such an environment, but many others such examples are extant. Such an environment is present when it is desired to send different channels or subchannels to different places in the environment, but for cost, efficiency or other reasons, only a limited number of receivers are provided.

In the sports bar environment, for example, bartenders or managers want to be able to control the content on each TV without having to use single or multiple TV remotes, since using a TV remote now requires walking to each TV with a specific remote to change the channel and further may cause adjacent TVs to also change channels.

One such receiver system, although there are many such receiver systems, that is often placed in a multiple TV environment such as a sports bar is a content distribution system, which is a satellite TV receiver system capable of tuning and transcrypting a plurality of TV channels and which tunes and demodulates a motion picture entertainment group (MPEG) standard MPEG-2 transport stream. The receiver system further distributes the streams in an environment through a communication network using a transmission device. The transmission device may be a quadrature amplitude modulation (QAM) modulator device for transmitting a broadcast cable signal or an internet protocol (IP) data distribution device for transmitting an IPTV signal.

In a broadcast cable signal distribution system, the receiving system includes a modulator card or board that receives the demodulated MPEG-2 transport stream for further distribution. The card includes a QAM modulator that receives MPEG-2 transport packets from an Ethernet port and then QAM modulates the MPEG-2 transport packets on one of a plurality of carrier frequencies. Each input stream results in one output QAM modulated channel (such as cable channel 50-1). The user (e.g., bartender) may further change a video program displayed on one of the televisions at the establishment by changing channels on the television.

The receiving system is also typically installed with a limited number of tuning resources (e.g., tuners). Most installations will service a number of televisions in the environment that is greater than the number of tuning resources installed. As a result, conflicts may arise with respect to the video programming displayed on one or more of the televisions. For instance, the system may not have a sufficient number of tuning resources to provide the request change. Further, the user may be unaware that the change may affect the operation of other televisions.

A similar problem exists for video recording, particularly with respect to identifying recording conflicts. In the video recording setting, when more than the maximum number of programs is to be recorded, the user is presented with the conflict and asked for the solution. However, the video recording solution does not include operation on multiple televisions simultaneously and does not address limited tuning resource problems. Therefore, there is a need for an improved mechanism for managing the signals supplied to multiple video display devices in an establishment. Further, in order to minimize an undesired or unexpected interruption of television viewing for some or all of the patrons at a facility, a user interface that permits management of the channel/resource allocation in a way as to minimize impact of the additional channel request would be advantageous.

SUMMARY

According to an aspect of the present disclosure, a method for controlling content being provided to a plurality of devices is described. The method includes receiving a request to change a program being provided on a first device in the plurality of devices, determining if the requested change requires changing the program provided to at least one second device in the plurality of devices, and outputting a list of programs currently provided to a subset of the plurality of devices if the requested change requires changing the program to the at least one second device, the subset of devices including the first device and the at least one second device.

According to another aspect of the present disclosure, a method associated with a user interface for controlling content being provided to a plurality of devices is described. The method includes displaying a first plurality of visual elements associated with programs that are available for display on a set of video display devices, displaying a second plurality of visual elements associated with the set of video display devices, each of the visual elements including an indication of a current program displayed on each of the set of display devices, receiving a request to change the current program to a new program displayed on one of the set of video display devices, determining if the request requires changing the current program to the new program displayed on at least one additional video display device in the set of video display devices, and displaying a third plurality of visual elements associated with a subset of video display devices from the set of video display devices if it is determined that the request changes the current program on at least one additional video display device, the subset including all video display devices that require changing the current program to the new program.

According to a further aspect of the present disclosure, an apparatus for controlling content being provided to a plurality of devices is described. The apparatus includes an input circuit that receives a request to change a program being provided on a first device in the plurality of devices, a controller coupled to the input circuit, the controller determining if the requested change requires changing the program provided to at least one second device in the plurality of devices, and a video display coupled to the controller, the video display displaying a list of programs provided to a subset of the plurality of devices if the requested change requires changing the program to the at least one second device, the subset of devices including the first device and the at least one second device, the list showing the programs currently provided to each of the subset of the plurality of devices.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
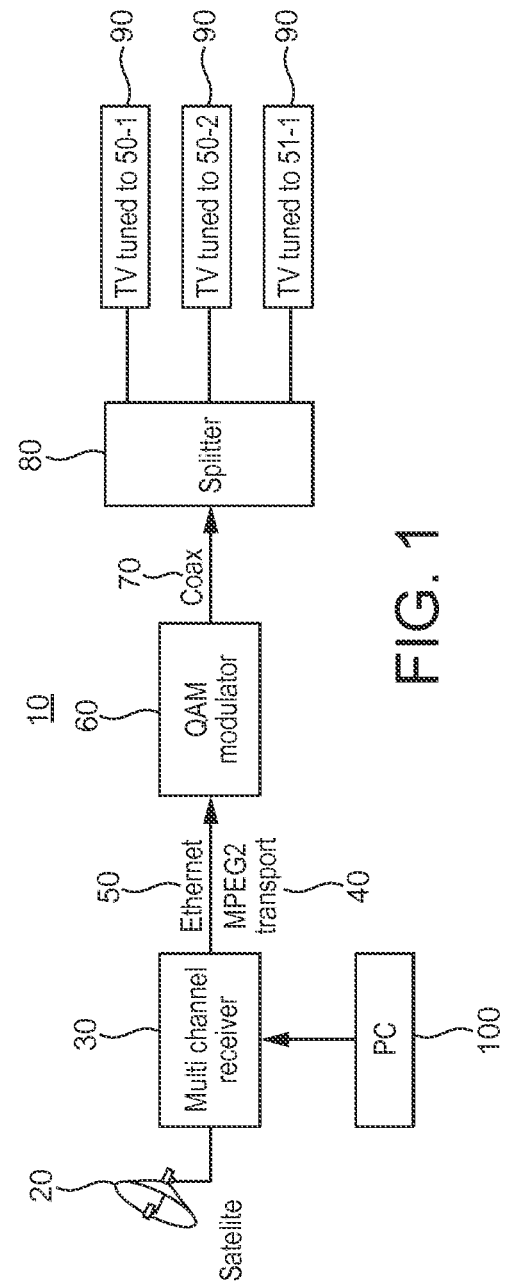
FIG. 1 is a block diagram of an embodiment of a content distribution system in accordance with the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is related to mechanisms for managing the tuning and delivery of signals from a centralized device to a plurality of display devices. In particular, one or more embodiments describe device a process and user interface for managing the receiving and distribution of broadcast signals to a plurality of televisions at an establishment (e.g., a bar, restaurant, stadium, casino, or the like). It should be apparent to one skilled in the art that similar mechanisms may be used in conjunction with other systems. For instance, the process and user interface may be adapted for a home media distribution system that uses a centralized controller and provides video programs to a plurality of video display devices in the home. Further, the process and user interface may also be adapted for use in a multiple dwelling facility (e.g., apartment complex, hotel, or the like).

One or more embodiments of the present disclosure are directed at the problem of allocating the resources in a centralized content delivery and distribution system. The system receives requests for content to be tuned and delivered to one or more televisions and identifies any potential viewing conflicts as well as potential options for changes. A user interface is described that provides an indication that the content delivery system does not have an additional receiving resource for the latest channel request and further displays, in a graphical manner, the potential re-allocation options, including a prioritization based on the number of televisions viewing each program as well as a display of which televisions are viewing the various programs. The embodiments have advantages over previous approaches, particularly when operating on multiple televisions simultaneously. Further, the present embodiments address limited tuning resource problems by identifying and displaying a prioritization based on how many televisions are viewing the current programming and further permits the user to choose a solution based on the locations of the televisions currently viewing the programs.

Referring now to the Figures wherein like reference numerals refer to like elements, in FIG. 1 a preferred embodiment of a content distribution system according to principles of the disclosure is shown at 10. A satellite signal 20 provided by a service provider through a satellite dish is input to a multichannel receiver 30. The satellite signal 20 contains a plurality of program streams (e.g., audio, video, data) organized or grouped into sets of channels or transponders. Multichannel receiver 30 tunes and demodulates one or more channels or transponders in the satellite signal 20 and produces an MPEG-2 transport stream 40 having packets, preferably user datagram protocol (UDP) packets, containing data, audio, and video programming to be distributed to the environment. In a preferred embodiment, COM 24 receiver 30 includes tuning and demodulation circuits to receive 24 channels or transponders simultaneously. It is important to note that other versions may be possible, including systems capable of receiving more or fewer channels or transponders.

The MPEG-2 transport stream 40 is preferably transported by an Ethernet link 50 to a quadrature amplitude modulation (QAM) modulator 60 which modulates the MPEG-2 transport stream 50 to produce one or more QAM channels. While preferred embodiments of the invention utilize QAM modulators and MPEG-2 transport streams, it will be appreciated by those skilled in the art that other kinds of modulators are equally usable and many different types of transport protocols are also usable. Therefore, VSB modulators, QPSK modulators, OFDM modulators, and their equivalents are all covered by the current invention. Moreover, IP signaling transport streams, DVB transport streams, MPEG-4 transport streams, ARIB transport streams, and their equivalents are also covered by the disclosure.

Preferably, the QAM modulator 60 modulates the MPEG-2 transport stream 40 on one of twelve carrier frequencies. Each input stream 40 results in an output QAM modulated channel which is output over a coax cable 70 and split into more than one signal using splitter 80. The signals from splitter 80 are provided to TVs 90. In this fashion, the QAM modulator 60 permits dynamic duplication of output channels so that each TV 90 may be statically tuned to a fixed channel, for example, channels 50-1, 50-2, 50-3, etc., thereby eliminating the necessity for each channel to be individually tuned with a separate remote and allowing different programs to be played on different TV sets 90 without interference from other, nearby TV sets being tuned with a remote control to provide different desired programs. Optionally, a PC web browser 100 is provided interfaced to the receiver 30 to control the data programming necessary to accomplish these results and to provide other functionality to perform the functions of content distribution system 10.

A content distribution system, such as described FIG. 1, allows multiple channels to be played on multiple TV sets without the need to separately tune the TV sets using a remote control, which would potentially interfere with the channels being broadcast on nearby TV sets in an environment. A modulator dynamically duplicates the output of channels, thereby allowing multiple TV sets to be statically tuned to a fixed channel and potentially to different fixed channels. The modulator can then duplicate the output so that a single input MPEG-2 transport stream can be sent out on multiple channels and/or sub-channels to each of the TV sets.

Figure 2:
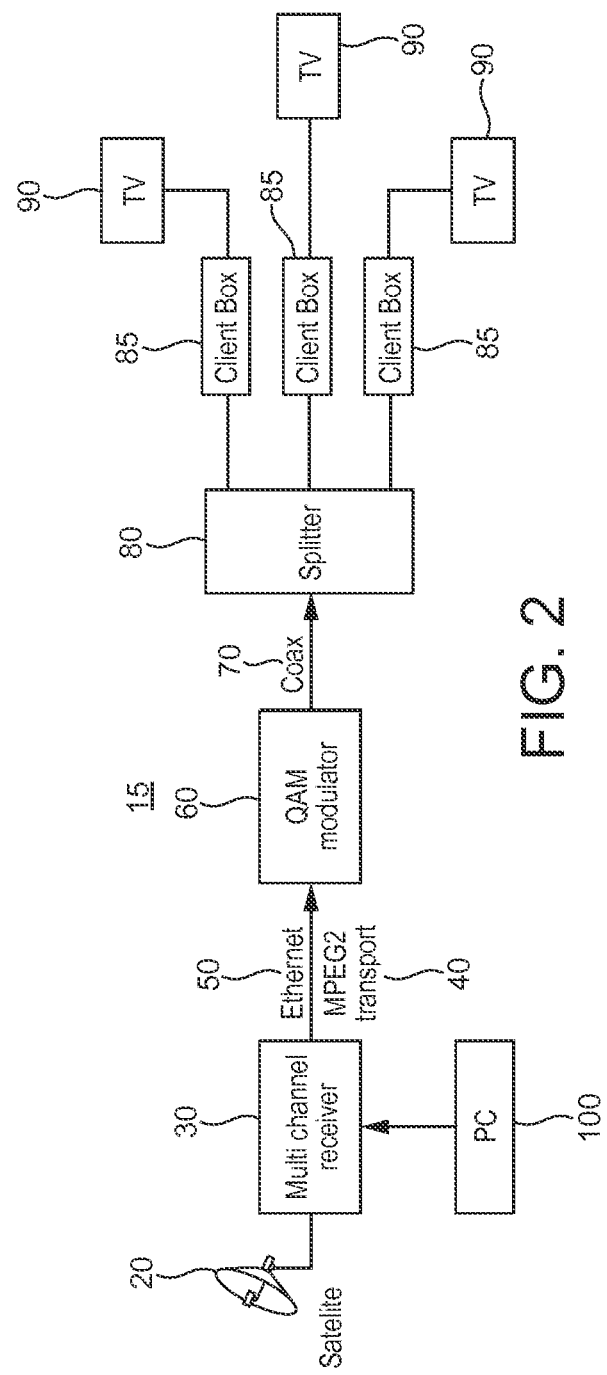
FIG. 2 is a block diagram of another embodiment of a content distribution system in accordance with the present disclosure.

The system in FIG. 1 describes a multichannel distribution control system operating with the outputs for the modulators controlled to provide specific streams and with the TV devices remaining tuned to a fixed channel. However, additional operational flexibility may be possible if the television channel programming is also addressable. Turning to FIG. 2, another embodiment of a content distribution system according to principles of the disclosure is shown at 15. Content distribution system 15 illustrates a system for delivering content to a plurality of video display devices that also incorporates addressable QAM signal receiving equipment that may be present in the bar, casino, or multi-room facility. Content distribution system 15 includes elements identified by the same reference numbers as shown as shown in FIG. 1. Except as described below, these elements operate in a manner similar to same elements described in FIG. 1 and will not be further described here.

Client boxes 85 receive a signal (e.g., a QAM signal) distributed from QAM modulator 60 through splitter 80. Client boxes 85 may be set top or set back converter boxes that are often used with some (older) television sets that may not be capable of receiving QAM signals directly. Client boxes 85 include a QAM tuner input circuit, a signal conversion circuit, a user remote control circuit, a high definition multimedia interface (HDMI) output interface, an audio/video output interface, and a channel 3/4 output interface. Client boxes 85 receive the input signal, convert the input signal to a signal format that is compatible with a television or other type of display device (e.g., TV 90), and provide the converted signal to TVs 90.

In addition, the client boxes 85 are addressable over the communication network through splitter 80. As a result, the channel that is tuned by each client box 85 may be controlled by signals sent from QAM modulator 60. Each client box 85 has a unique Receiver Identifier (RID) that is used for remote addressability. For example, if a particular client box 85 has a RID of 12345678 then a tuning message signal may be sent using the following exemplary code format for controlling the QAM modulator 60:

http://192.168.3.132/cgi-bin/webcmd?screen=Command401& MessageType=5&rid=12345678&majorNum=18&minorNum=2&text=&tftplp=192.168.1.254

The code above includes an application identifier at the beginning. The section Command401 identifies the type of device and Message Type identifies the type of command message sent to the device. "MessageType=5" means tune to a channel. The rid is the receiver identification for the device, as described above. The remainder of the code identifies the actual information associated with the command.

In an example of a tuning sequence, the client box 85 with rid=12345678 receives the message and is tuned to a QAM channel 18-2. QAM channel 18-2 includes programming for channel 284 received by a tuner in multichannel receiver 30. The programming is provided at output port 34 on QAM modulator 60, which is mapped to RF channel 18, slot 2). As a result, the client box tunes to 18-2 while the multichannel receiver 30 tunes to 284 and QAM modulator outputs the program on QAM 18-2.

If a change in the viewed program on the television 90 connected to a client box 85 is desired, the channel tuned by QAM24 receiver 30 may be changed, for instance from 284 to 206. The program from the new channel output will remain streaming out on port 34 from QAM modulator 60, leaving the client box 85 tuned to the same channel. As a result, tuners may be tied to QAM output channels and control messages may be sent to client boxes 85. The programming displayed on televisions 90 may be changed either by switching the client boxes 85 to a different QAM channel or by changing the satellite service playing out to a QAM channel that may be married to one or more of the client boxes 85. It is important to note that the code structure shown above may also be used to send a software update to the client boxes 85.

The content distribution system 10 in FIG. 1 focuses primarily on conventional RF signal transmission and uses non-addressable physical QAM tuning and channels to deliver media content. However, certain configurations of the signal distribution systems, such as may be found in casinos or multi-room facilities, may benefit from the additional flexibility offered by the addressability features described in content distribution system 15. This additional flexibility may be used in conjunction with, or instead of, the system described in FIG. 1.

It is important that although the content distribution system 15 described is described using addressable QAM receiver devices (e.g. client boxes 85), similar principles may be applied to content distribution systems using a delivery medium other than a QAM signal. For example, content distribution system 15 may easily be adapted for operation using IP content delivery. The outputs from QAM modulator 60 would be IP streams (e.g., multicast IP streams) and the client box 85 would receive the IP streams and convert the IP streams for delivery to a TV 90. In this configuration the IP streams, rather than the channels, are controlled through either a modulator (e.g., QAM modulator 60) or a client box (e.g., client box 85) allowing further program stream mapping flexibility.

Figure 3:
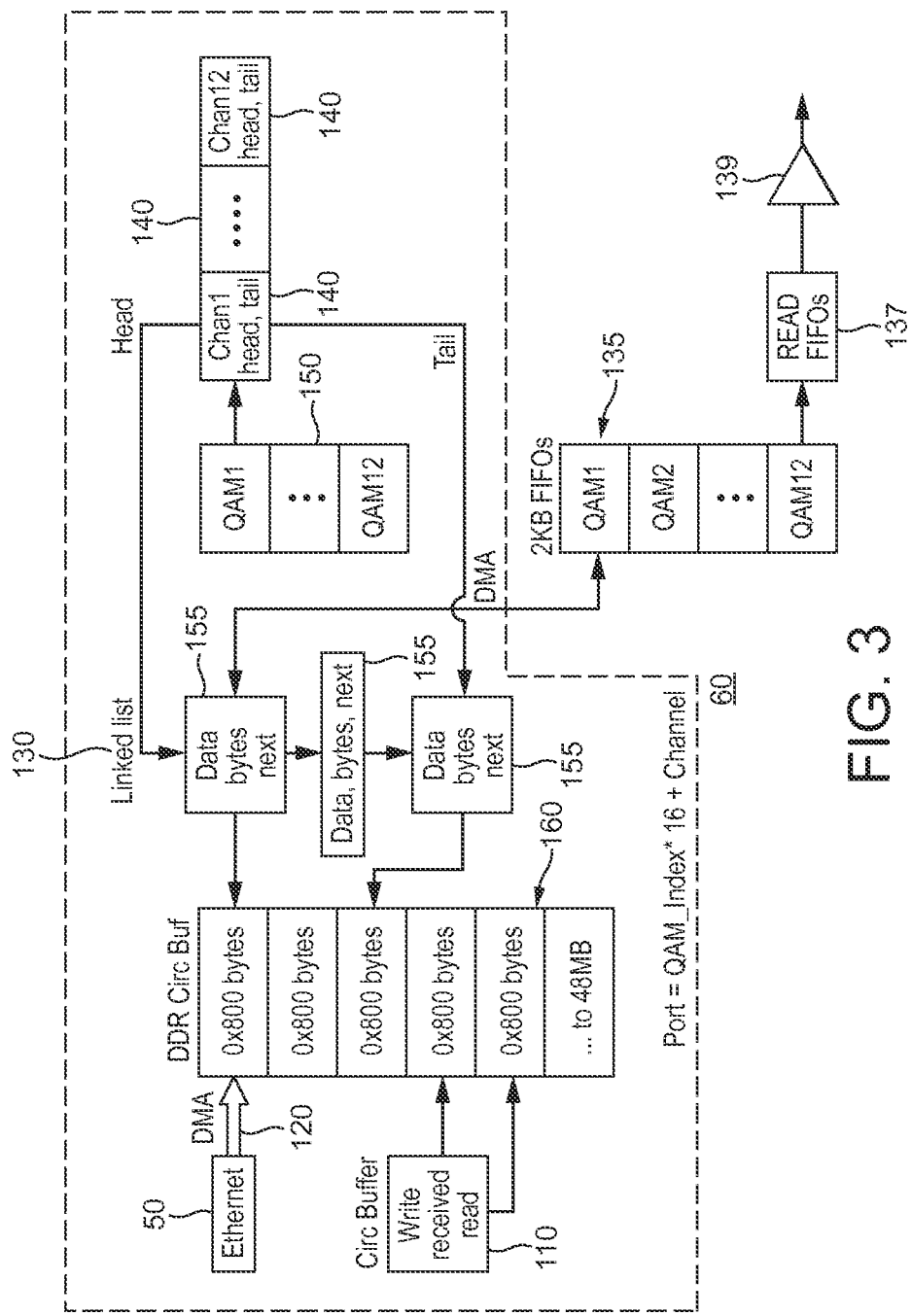
FIG. 3 is a block diagram of a preferred embodiment of a modulator used in a content distribution system in accordance with the present disclosure.

Turning to FIG. 3, a block diagram of a preferred embodiment of a QAM modulator 60 used in a content distribution system in accordance with the present disclosure. QAM modulator 60 supports 12 QAM streams 150 with up to 12 video channels per QAM stream. Each of the video channels 140 can have a bitrate of 20 Mbps with up to 500 ms of jitter that must be buffered. If a separate first in first out buffer (FIFO) is used for each channel the memory buffer requirements are:

> 144 channels*20 megabits per second (Mbps)*0.5 seconds/8 BitsPerByte=180 Megabytes (MB) of buffering memory.

However, it will be recognized that distributed systems typically are buffer limited and therefore only have limited memory capacities. The exemplary QAM modulator 60 only has 64 MB of double data rate (DDR) memory. Using a separate FIFO for each channel also requires that every transport packet be copied into the FIFO and then be copied out of the FIFO.

In order to overcome these issues, QAM modulator 60 utilizes a buffering model which reduces the amount of memory required for buffering and reduces the central processing unit (CPU) load required to move the transport packets. When the Ethernet packets are received at an input port of modulator 60 they are automatically placed into a single circular buffer 110 by the Ethernet direct memory access (DMA) 120. Instead of then copying the transport packets into separate FIFOs based on the video channel, the transport packets are left in the common circular buffer 110. A descriptor 155 is created for each group of transport packets in a UDP packet. The descriptor indicates the memory location(s) 160 and number of bytes of the transport packets in the common circular buffer 110.

Instead of immediately moving the transport packets into a FIFO, the descriptors are placed in a linked list 130. This permits the common circular buffer 110 to be used as a jitter buffer for all channels 140. Since the maximum data rate of a QAM256 stream is 38.8 Mbps, the buffer memory requirements are:

> 12 QAM256 streams*38.8 Mbps/QAM256 stream*0.5 seconds/8 BitsPerByte=29.1 MB of DDR memory.

This solution also reduces how many times the transport packets must be copied since the packets do not have to be copied into separate per channel FIFOs.

Giving QAM modulator 60 the ability to duplicate channels allows a single MPEG-2 transport packet to appear at multiple QAM frequencies, and further allows for multiple sub-channels to be statically tuned to a fixed digital cable channel on each TV 90. The multichannel receiver 30 (in FIG. 1 or 2) can then be commanded to tune to a broadcast channel (e.g., a satellite channel) and to output an IP encapsulated MPEG-2 transport stream to QAM modulator 60.

The input 40 to the QAM modulator 60 is a single program transport stream (SPTS) but the output of the QAM modulator 60 is a multiple program transport stream (MPTS) that is QAM modulated. This requires PID remapping and creation of a unique Program Map Table (PMT) for each channel to define the PIDs for each channel. The QAM modulator's input UDP port directly controls which QAM channel and sub-channel that is output.

Duplicating an input channel requires modifying the packet PIDs for each different output, and creating a different PMT. It is preferable to use a DMA to transfer a packet to a QAM modulation block. After the DMA is completed, the packet is then scheduled for another DMA to a different QAM modulation block as if that packet had also been received from the Ethernet connector on a different UDP port. This permits the packets to be "chained" in the linked list 130 from one UDP input port to the next UDP input port until the input channel has been duplicated the desired number of times.

QAM modulator 60 implements a process which allows multiple TV receivers to be each statically set so that remote controls need not be used to change the programs for each TV. In order to accomplish this result and implement the DMA transfers of FIG. 2, first the UDP packets containing MPEG-2 transport packets are read from the Ethernet MAC by using the receive DMA engine to copy the Ethernet packets to main memory in circular buffer 110. The CPU then analyzes the destination UDP port number to add new entries to the correct pending list of DMA requests 130. There is one linked list of pending DMA requests 130 for each sub-channel 140 (up to 12) for each QAM carrier 150 (up to 12) for a total of 144 possible linked lists of pending DMAs. The DMA engine uses a linked list 130 of pending DMA requests (stored in RAM block). The pending DMA requests place the packets into circular buffer FIFOs 135. The data in FIFOs 135 are then read at 137 by the QAM modulator 60, and sent to an ND converter 139 for eventual output to the content receiving devices, for example TVs. While FIFOs and circular buffers are used in preferred embodiments, it will be appreciated by those skilled in the art that any type of buffer memory that is adaptable for storing DMA requests may be used.

All completed DMA requests are then finalized, and the size of the Ethernet packet is stored and monitored while a counter which keeps track of how many packets are in the circular buffer is incremented. New DMA requests are then taken from 130 and started. In a preferred embodiment, the linked list 130 contains descriptors pointing to packets that eventually need to be processed as part of the DMA, but the DMA is not yet scheduled. Additionally, there is a separate linked list of DMA requests (not shown in FIG. 2) that have been started but the DMA hardware has not yet completed.

Figure 4:
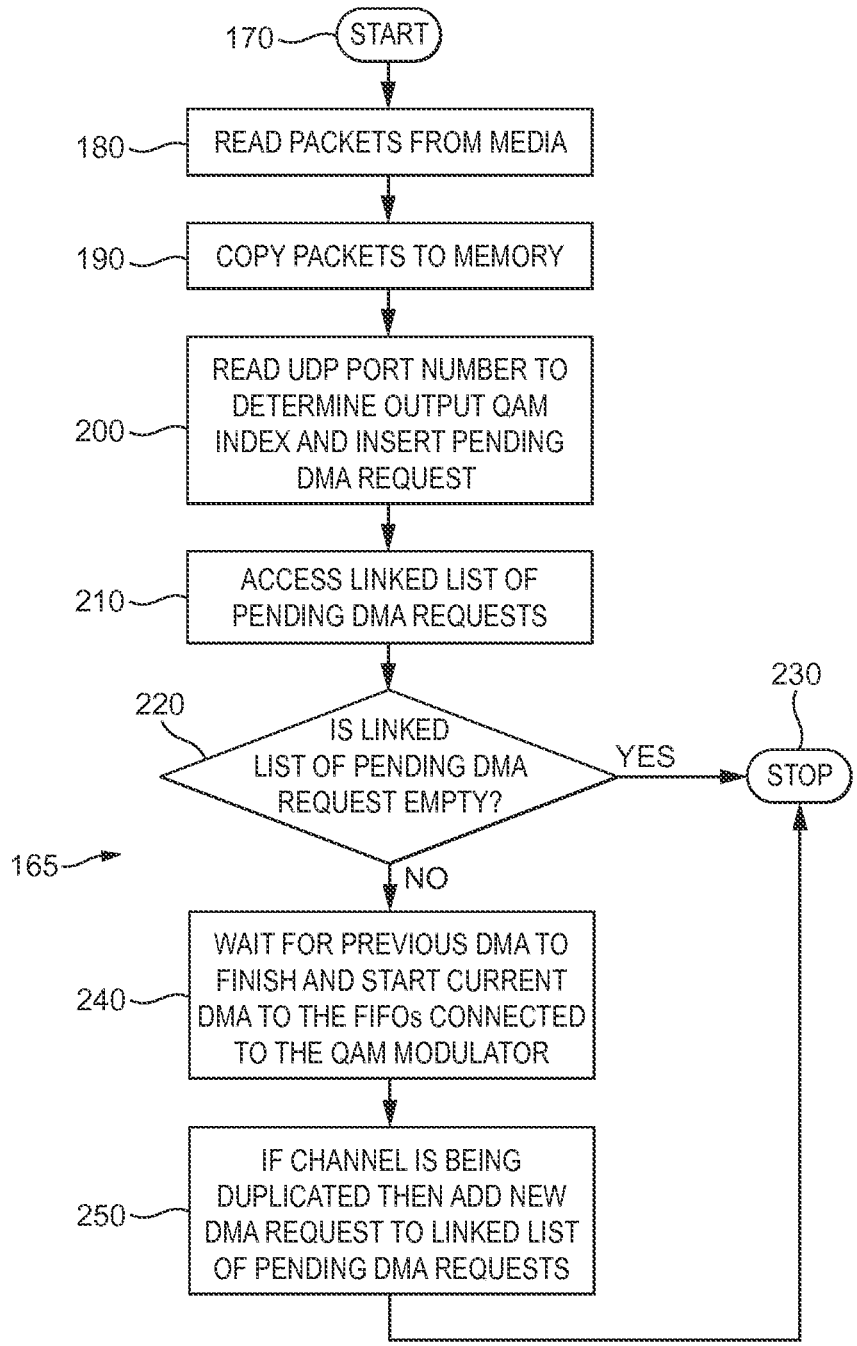
FIG. 4 is a flow chart of an exemplary process for assigning channels in a content distribution system in accordance with the present disclosure.

Turning to FIG. 4, a flow chart of an embodiment of a process 165 for assigning channels in a content distribution system in accordance with the present disclosure is shown. Process 165 primarily describes a process for assigning static channels or sub-channels. One or more steps in process 165 may be incorporated in QAM modulator 60 described in FIG. 3. Further, one or more steps of process 165 may be incorporated into one or more blocks for the content distribution system 10 described in FIG. 1 or content distribution system 15 described in FIG. 2.

Process 165 begins at step 170. At step 180 the data packets are read from the media source, for example Ethernet port 50, but it will be recognized that other data sources may be used, for example the Internet, downloadable media, digital versatile discs (DVDs), Blu-ray discs, or other sources of packetized data. Additionally, it will also be appreciated that programs, other than video programs and content, may be modulated and output in accordance with the present embodiments. Data programs, games, computer programs, audio channels, wireless communications are all types of content which may be modulated and output in accordance with the invention. Moreover, many different types of devices, other than video displays, may receive the content. For example, audio receivers, computers, network devices, distributed networks and other devices and systems may also receive output modulated signals created in accordance with the invention.

At step 190, the data packets are copied to memory, preferably the circular buffer memory 110. At step 200 the destination UDP port number of the received UDP packet is read to determine the output QAM index and insert pending DMA requests. At step 210 the lists of pending DMA requests are accessed, and it is then determined at step 220 whether the linked list of pending DMA requests is empty. If so, then the method stops at step 230.

However, if it is determined, at step 220, that there is a current DMA request, then, at step 240, the previous DMA requests must be finalized and the data packets associated with the current DMA request are passed in the DMA process to the FIFOs 135 attached to the QAM modulator 60. At step 250, if the current channel is being duplicated then the additional DMA requests are then added as new DMA requests to the linked list 130 of pending DMA requests and the method stops at step 230. Similarly, the packets associated with each of the DMA requests stored according to the linked list are output from the QAM modulator 60.

It will be further appreciated by those skilled in the art that QAM modulator 60 includes a central processing unit (CPU) which is adapted to perform, among other necessary data processing and steps, the necessary steps taught herein to accomplish preferred embodiments of the invention. When performing these necessary steps, the CPU acts as a special purpose computer specifically programmed to perform these steps and functions.

The CPU of the QAM modulator 60 (preferably, but not limited to, a Nios II CPU) analyzes the next Ethernet packet in the circular buffer 110 to determine the packet type and place MPEG-2 transport packets into the correct linked list 130 by analyzing the destination UDP port number. UDP packets with port value between 0x200-0x2ff are used to control the operation of QAM modulator 60 and query its status.

The UDP packets with port value (QamIndex*16+ChannelIndex) contain MPEG-2 transport packets which are 188 bytes long. Up to seven MPEG-2 transport packets are in each UDP packet. The MPEG-2 transport packets are placed into linked lists 130. Each of the 12 QAM streams contains an array of 12 channels. Each channel has a linked list of MPEG-2 packets. A bitmap (12-bit integer) is inserted and maintained that identifies which QAM stream has pending packets. Further, within a QAM stream, a bitmap is inserted and maintained that identifies which channels in the QAM stream have pending packets.

The Nios II CPU monitors and determines which FIFOs have space available and which linked lists have data and then schedules a DMA request. There is a bitmap (12-bit integer) of which FIFOs have space available. Each QAM stream is given a chance to schedule a DMA before the first QAM stream is analyzed again and within a QAM stream each channel is given a chance to schedule a DMA before the first channel is analyzed again.

Looping through the QAM streams and channels prevents one QAM stream or channel from delaying the data from the other channels. The DMA requests then go into a linked list of pending DMA requests.

In a further preferred embodiment, an external control device, such as PC 100 described in FIG. 1 or FIG. 2, can send commands to multichannel receiver 30. Multichannel receiver 30 then sends commands to QAM modulator 60. Alternatively, the PC 100 can directly send commands to QAM modulator 60 to dynamically change which MPEG-2 transport streams being received by QAM modulator 60 are duplicated and also dynamically change the desired destination QAM carrier and sub-channels. A single input channel can be duplicated multiple times such that a single MPEG2 transport stream could be duplicated up to 23 times so that 24 different TVs (each statically tuned to a different virtual channel) would all display the same video content. For example, if a sports bar content distribution system had only six tuners/receivers but used 24 TVs, QAM modulator 60 can then act like a switching matrix to control which input MPEG-2 transport stream is sent to which output virtual channel so that each TV can be statically tuned to a fixed channel.

A content distribution system, as described above, thereby allows multiple television programs and channels to be output to multiple TV sets in an environment, thereby eliminating the need for remote controls to be used to change channels and potentially interfere with neighboring TV sets. Using the QAM modulator and DMA process, the present embodiments permit the system to dynamically duplicate the output of channels, thereby allowing multiple TV sets to be statically tuned to a fixed channel. The system may duplicate the output so that a single input MPEG-2 transport stream can send out multiple channels and sub-channels to each of the desired TV sets.

The content distribution systems and components described in FIGS. 1-3 thus provide a remarkably versatile yet simple system to display multiple programs on multiple devices from a single input transport stream. It is also useful to provide a user interface that allows for the control of all such programs and devices. The user interface would allow a user (e.g., bartender or manager) an environment or establishment to search for and monitor video content on all of the TV sets in the environment to determine what programs are playing on the various TV sets.

In order to provide the program and video content through a user interface, information about the environment and established may be entered by the user. Further, information about the program content is retrieved from the signal provider through the received signal as well as the current status for tuning in the receiving circuit (e.g., multichannel receiver in FIG. 1 or FIG. 2). Preferably, the information to know what channels are currently playing is retrieved from an XML file that is available from the tuner device. The XML file may be generated using the following script:

```
<tunerList>
<tuner>
<chassis>8</chassis>
<slot>3</slot>
<index>1</index>
<cardIp>192.168.3.132</cardIp>
<ip>192.168.6.9</ip>
<port>33</port>
<streamId>0x80000004</streamId>
<chan>1065710</chan>
</tuner>
...
</tunerList>
```

Using an XML file permits the user interface to be easily modified or replaced with a different technology such as Java, Flash, or a native executable.

A controller, included as part of the receiving circuit (e.g. multichannel receiver in FIG. 1 or FIG. 2), generates an XML file every five minute that lists the information necessary to display and search the channels. The web page reloads this XML file every five minutes according to the following script:

```
<channelList>
<chan>
<ma>13</ma>
<mi>65535</mi>
<n>ABC</n>
<o>276834</o>
<l>0</l>
<e>Local News</e>
<c>Local,News</c>
</chan>
...
</channelList>
```

Figure 5:
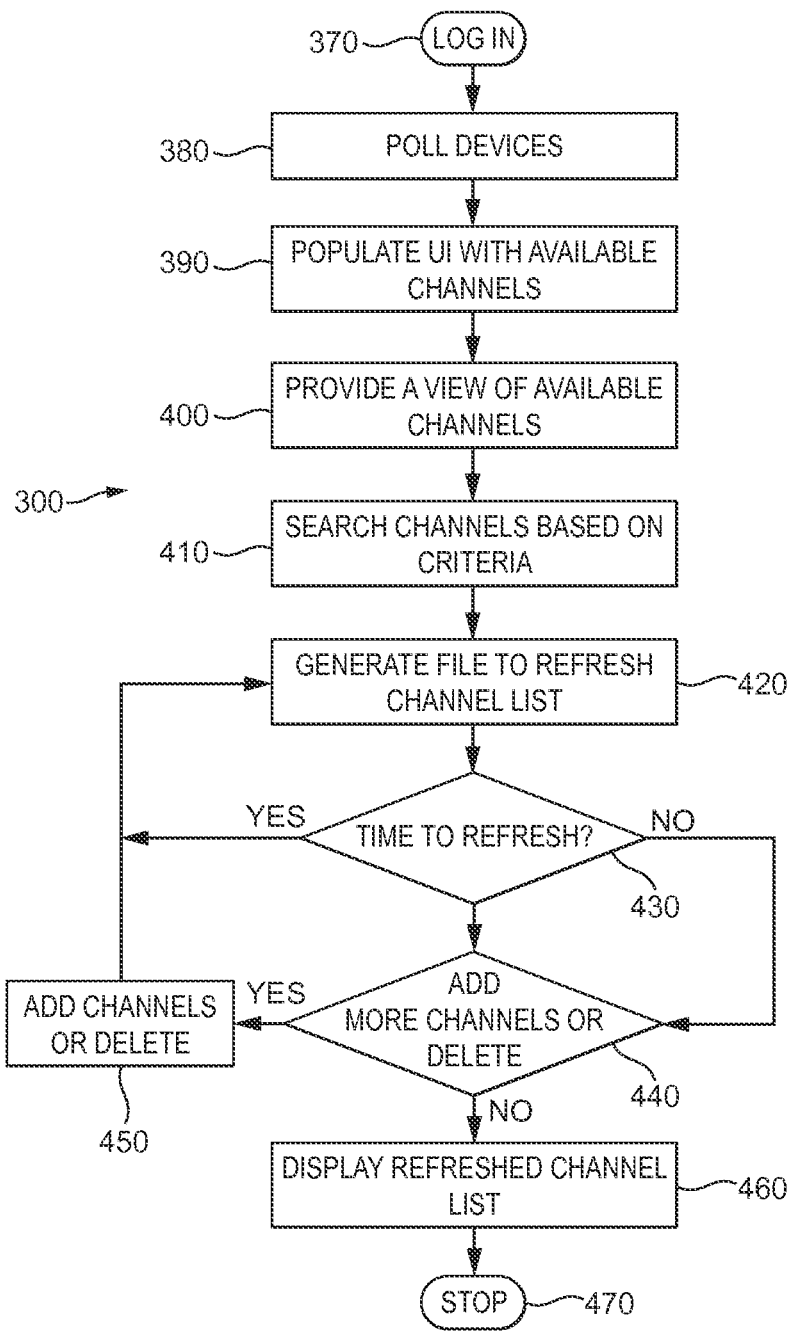
FIG. 5 is a flow chart of an exemplary process for controlling a group of output devices which are statically tuned to individual outputs in accordance with an embodiment of the disclosure.

The information generated using the scripts described above as well as information input by the user (e.g., number or televisions, etc) is used to generate a user interface process as part of a content distribution system. Referring now to FIG. 5, a process 300 for controlling a group of output devices which are statically tuned to individual outputs in accordance with the present disclosure is shown. One or more steps in process 300 may be incorporated in QAM modulator 60 described in FIG. 3. Further, one or more steps of process 300 may be incorporated into one or more blocks for the content distribution system 10 described in FIG. 1 or content distribution system 15 described in FIG. 2. It will be further appreciated that process creates dynamic a user interface that allows a user of the content distribution system to control the system from a central location without interfering with each of the devices to which a statically tuned output, for example a TV program, exists.

The method begins at step 370 wherein the user logs into the system as described above. At this point, the login password may be changed, or otherwise managed. At step 380, the system polls the devices in the system (e.g., multichannel receiver 30, QAM modulator 60) in order to populate the user interface with system information, including which display devices (e.g., TVs 90) are, for example, displaying which program streams. After polling then, at step 390, a list is generated or populated that includes the available channels to the content distribution system.

At step 400, the list generated at step 390 is provided as part of a view of the available channels on the user interface. The generation of the view may be accomplished by the retrieval of the aforementioned XML file, or by equivalent retrieval of information from other sources, for example the content provider, the Internet, or internal sources. More preferably, the channel view of the available channels is provided to the user interface.

At step 410, the user (e.g., bartender or manager) searches the available channels based on a set of relevant criteria. The search for channels may be based on channel name, channel number, text, category, events, or other criteria specifically designed for, or peculiar to, the content distribution system as discussed above. At step 420, the file retrieved at step 390 may be regenerated or refreshed to generate or refresh the available channel list, as the case may be. During the initial set-up of the user interface, the available channel list may be initially set-up. As other channels are added or deleted, then the list is updated to keep it accurate and useful for the user. At step 430, a determination is made as to whether a refresh or update to the list is needed. The list may be refreshed based on a timer. The time interval for the timer may be, for example, five minutes. The user may also be provided with the ability to alter the refresh time according to the particular needs of the system. If it is determined, at step 430, that a refresh or updated is needed, then process 300 returns to step 420. Otherwise, process 300 progresses to step 440 where it is determined whether new channels exist, or existing channels must be deleted.

If, at step 440, new channels exist or channels are to be deleted, then, at step 450, the channels are added or deleted and process 300 returns to step 420 for the addition or deletion of the channels from the file. Otherwise, process 300 continues to step 460 wherein the refreshed list is displayed. Process 300 stops at step 470.

User interfaces for implementing one or more of the features described herein may be implemented as a hypertext markup language (HTML) web page with Javascript. Javascript code may be used to implement drag and drop boxes. A user interface, such as the Technicolor MediaTune interface, implements the functionality of the user interface described herein using this Javascript. However, it will be appreciated that any type of script or programming language may be used to implement the inventive UIs taught herein. It should be appreciated that those skilled in the art may design alternateive user interfaces to satisfy the particular needs of content distribution systems without departing from the scope of the present disclosure.

Figure 6:
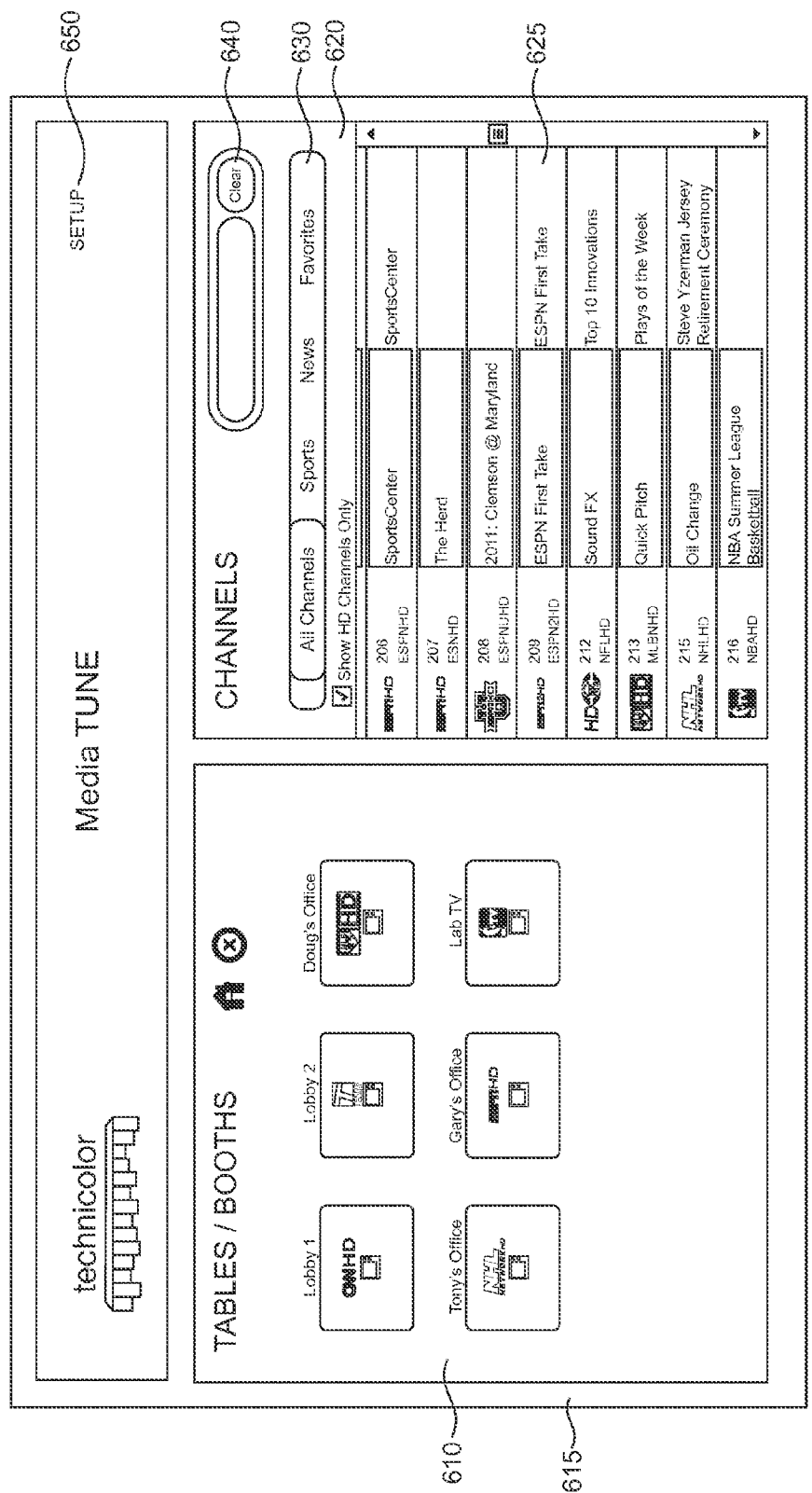
FIG. 6 is a screen shot of an exemplary main screen for a user interface in accordance with an embodiment of the disclosure.

Turning to FIG. 6 an exemplary user interface 600 combining many of the aspects described above is shown. User interface 600 permits operation in a visual drag and drop operating environment. User interface 600 shows televisions in use in display box 610 on the left and available channels in a display box 620 on the right. In display box, 610 the televisions in the system are shown as icons 615 with the icons including information associated with the currently displayed content. In display box 620, the available channels are shown as individual entry lines 625 with associated channel information in a scrollable list. Any available channel 625 in display box 620 may be selected and dragged to any one or more of the TV icons 615 shown in display box 610. Once the channel 625 is dragged, the TV icon 615 on the left is updated to show information for the content (e.g., the logo for the channel or program) now being displayed.

Additional features in user interface 600 include being able to duplicate a program between the different television icons 615 using a simple drag and drop operation. The left display box 610 may also include some form of a description for each of the television icon 615 (e.g., a number or a location for the television). The right display box 620 may also be "organized" using groupings or tabs 630. Examples of groupings or tabs 630 include, but are not limited to "sports", "news", and "favorites". Display box 620 may also include a search function 640. The search function 640 may allow direct text entry search for channel identifiers, program titles, or other information. The result of the search may result in a highlighted channel entry 625 in the list. User interface 600 may also include a setup icon 650 used for initial configuration or updates to the configuration (e.g., arrangement or identification of television icons).

As described earlier, the content distribution system may not include enough tuning resources to provide all requested programs. As a result, it may be possible that a request for a new channel to be tuned cannot be adequately fulfilled because all of the tuning resources are already being used for other channels. Additionally, the user may request a program change on a particular television without being aware that the current program is also being displayed on other televisions. It is desirable to determine such problems and to present the user (e.g., facility manager or owner) with the possible changes to the televisions and what they are tuned to and the impact (on the patrons of the facility). In this case, an additional user interface screen is displayed, presenting the user with a set of options for fulfilling the channel change request.

Figure 7:
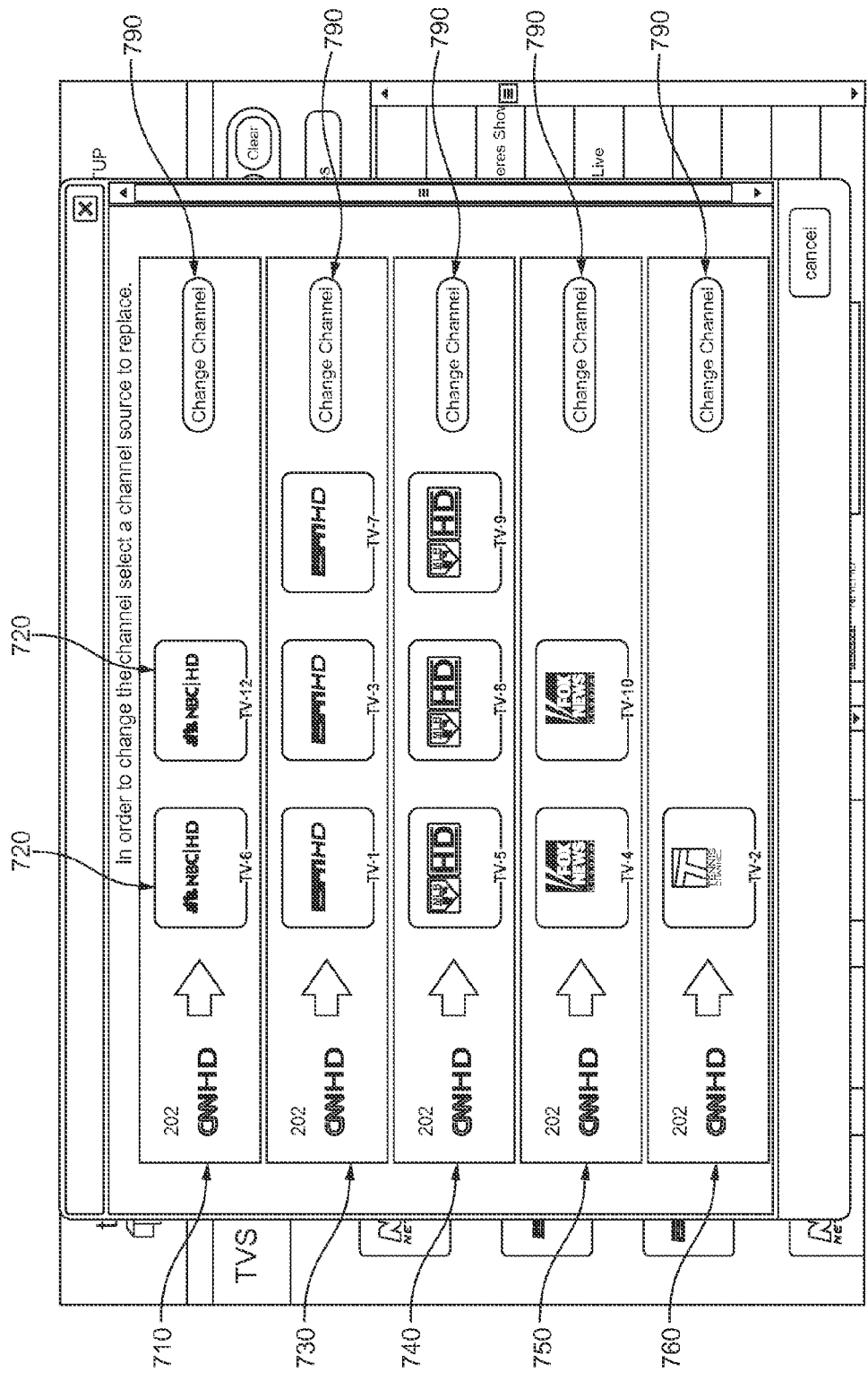
FIG. 7 is a screen shot of an exemplary overlay screen for a user interface in accordance with an embodiment of the disclosure.

Turning to FIG. 7, screen shot of an exemplary overlay screen 700 for a user interface in accordance with an embodiment of the disclosure is shown. Overlay screen 700 may used as part of the user interface as described above in FIG. 6. Overlay screen 700 may appear after the user (e.g., bartender or manager) initiates a program change on one or more of the television in the facility or establishment. Overlay screen 700 shows a listing of televisions and what they are currently viewing, and provides a set of options for fulfilling the channel request when the limit on tuning resources requires other televisions to be affected by the request.

In operation, a request made to tune channel 202 (CNHD) and provide this programming to television 11 (TV 11) in place of the currently viewed program (NBC HD). No tuning resources are available (e.g., from QAM24 receiver 30 in FIG. 1) to complete the request. As a result, overlay screen 700 appears and shows a set of entries 710, 730, 740, 750, and 760. The first entry 710 shows the impact of changing the current channel (NBC HD) provided to TV 11 and showing the other televisions 720 that are also currently using the same current channel (NBC HD). The remaining entries 730, 740, 750 and 760, displayed vertically, provide a list of groups of televisions (from largest number to smallest number of televisions) that are currently viewing a different channel than the requested new program. The second entry 730 shows that TV 1, TV 3, and TV 7 are currently viewing ESPN HD. The bottom entry 760 shows only one television, TV 2, that is currently viewing the Tennis Channel. For each entry 710, 730, 740, 750, and 760 the user is presented with a change channel button 790 on the right. Change channel button 790 allows the user to change the channel that is currently tuned (e.g., NBC HD, ESPN HD, Tennis Channel, etc) to the currently requested channel, CNN HD and to provide this new channel to the televisions listed in the entry along with TV 11.

Figure 8:
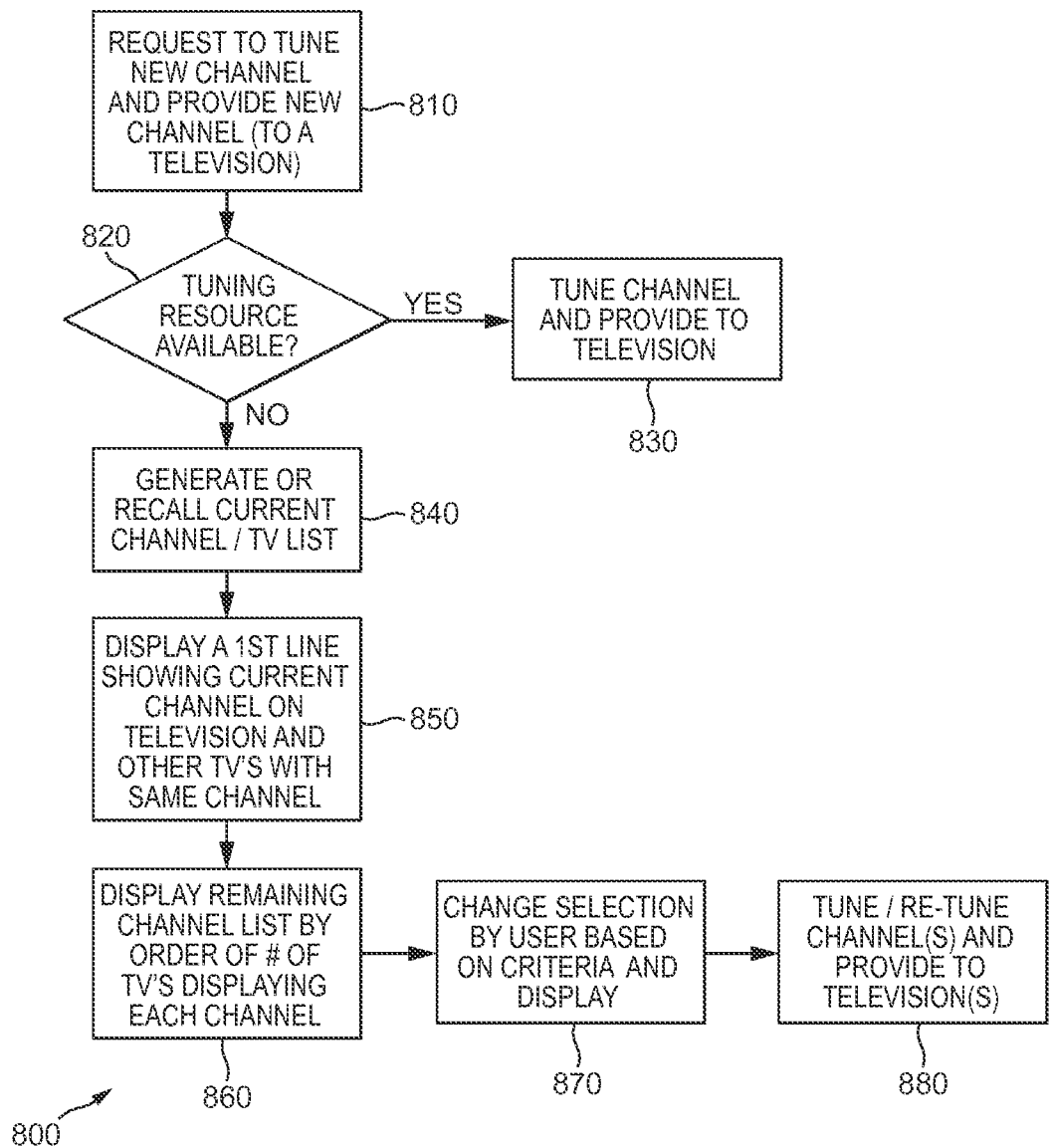
FIG. 8 is a flow chart of an exemplary process for displaying signals for multiple display devices in accordance with an embodiment of the disclosure.

Turning to FIG. 8, a flow chart of an exemplary process 800 for displaying signals for multiple display devices in accordance with an embodiment of the disclosure is shown. One or more steps in process 800 may be incorporated in QAM modulator 60 described in FIG. 3. Further, one or more steps of process 800 may be incorporated into one or more blocks for the content distribution system 10 described in FIG. 1 or content distribution system 15 described in FIG. 2.

At step 810, a request is made to tune to a program on a channel or transponder and provide this program to a particular television. As described earlier, the request may be made using the user interface and a drag and drop action by the user. At step 820, a determination is made as to whether any tuning resources are free and available. The determination, at step 820, may be important in order to prevent any unnecessary program changes in other televisions. In other words, if a tuning resource is available, the request may most easily be completed with an unused tuning resource and the new program provided to the television. As a result, no conflicts will exist with programs on other televisions. However, as mentioned earlier, content management systems often use limited tuning and distribution resources and it may not be possible to provide individual programs to each of the televisions in the establishment.

If, at step 820, it is determined that a tuning resource is available, then, at step 830, then the content management system adds the request to the channel lineup and tunes the channel or transponder containing the program. The program is added to the output signal set and provided to the television.

If, at step 820, it is determined that no more tuning resources are available, then tuning another channel or transponder or providing another program stream would require dropping one of the previous programs that was tuned and changing over those televisions that were viewing the previous program to viewing the new program. At step 840, a list of current channels that are tuned and the televisions that are viewing those channels is either generated, or may be maintained and recalled. This list, along with the requested channel, is used to generate the user interface overlay shown in FIG. 7.

Next, at step 850, the list is provided for display with the first or top entry indicating the impact of changing the programming to the current television. The top entry, at step 850, shows the other televisions that are also currently using the same current channel. At step 860, the remaining entries, vertically, provide a list of groups of televisions (from largest number to smallest number of televisions) that are currently viewing a different program. At step 870, the user selects an option from the selected list of options. The user may select one of the options as shown. The selection, at step 870 may result in changes to one or more tuning resources (e.g., tuners in COM 24 receiver 30 shown in FIG. 1) from the channel that the tuning resources are currently tuned to the new requested channel and provides the new channel and/or programs to the desired television as well as any other televisions that were viewing the previous channel. For example, if the user selects the second entry shown in overlay screen 700 shown in FIG. 7, then the tuning resource used to tune ESPN HD is now used to tune CNN HD, and program content CNN HD is provided to TV 11 along with TV 1, TV 3, and TV 7. The user may then choose to provide different programming to those other televisions (TV 1, TV 3, and TV 7) using other control option, such as a main user interface screen. The user may also request to tune yet a different new channel and return to this same process 800.

At step 880, after the user selects the option at step 870, the tuning resources (e.g., tuners in multichannel receiver 30 shown in FIG. 1) are tuned to the new channel or transponder and the new program is provided the televisions based on the option. In this manner, process 800 provides recognition of the impact of the channel change on the facility. Process 800 includes a prioritization or weighting to this impact on televisions, first by current channel change then by number of televisions viewing same channel, and on the patrons in the facility.

Figure 9:
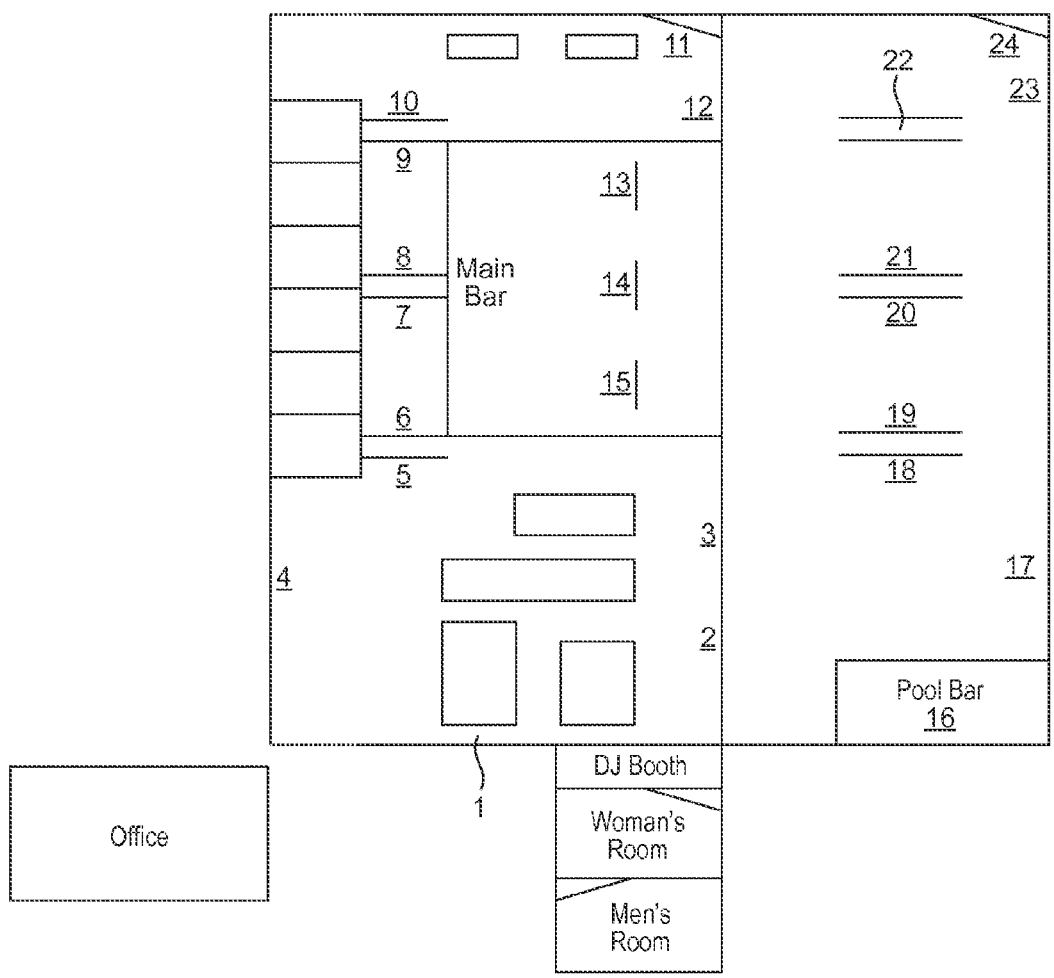
FIG. 9 is an illustration of an exemplary chart for placement of display devices in an establishment in accordance with an embodiment of the disclosure.

Further, the overlay screen 700 in FIG. 7 not only indicates a listing of the number of televisions that may be affected by the request or one of the alternatives, but also an identification of the actual televisions affected in the establishment or environment. The televisions may be identified or listed by an identification number or by a location. FIG. 9 illustrates a representative television location map for an establishment or facility. Television identification numbers are shown at various locations in the establishment or facility with each number corresponding to an entry for a television in a user interface screen, such as screen 600 shown in FIG. 6. The location map in FIG. 9 may be included as a separate screen in the user interface or may be maintained as a separate electronic or physical document at the establishment.

The use of a location map along with the identifiers for the televisions allow the user to understand any impact on specific patrons, based on the location of the televisions in the facility. As an example, suppose that a large number of patrons are currently watching TV 2 (currently viewing programming from the Tennis Channel). In this case, the user (e.g., bartender or manager) would likely not want to change TV 2, even though only one television is currently viewing the program. In this manner, the user may choose to change programs not only based on current channel impact or by number of televisions viewing a particular channel but also the viewing preferences of the patrons in certain areas of the establishment or facility.

Figure 10:
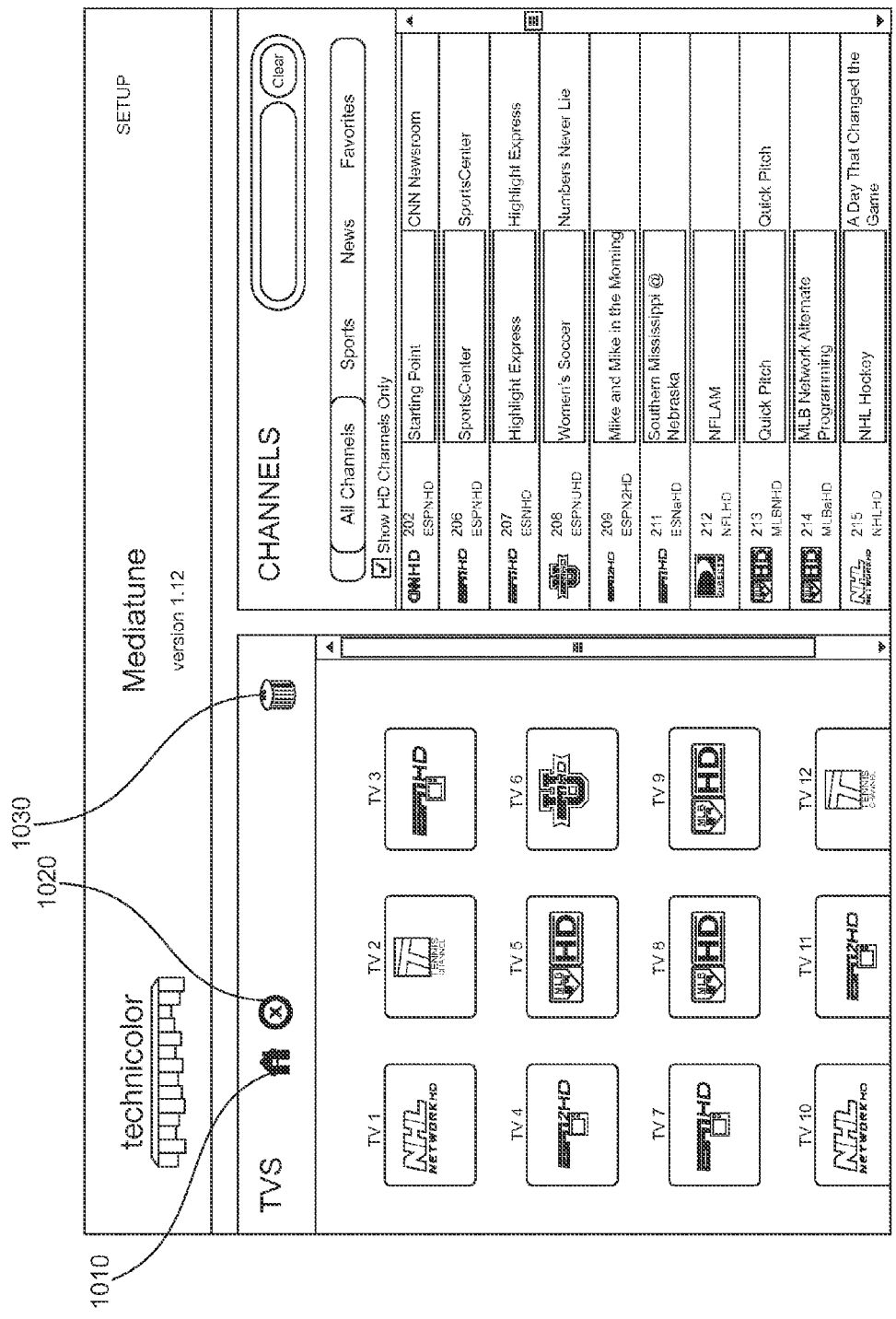
FIG. 10 is a screen shot of another exemplary main screen for a user interface in accordance with an embodiment of the disclosure.

Turning now to FIG. 10, a screen shot of another exemplary main screen 1000 for a user interface in accordance with an embodiment of the disclosure is shown. Main screen 1000 includes an additional important feature of a user interface for a content distribution system to further simplify the control of the relationship between tuners, channels, and televisions by providing one or more default configurations. A button 1010, shown as a home symbol, is located in the upper left portion of the display. When the user (e.g., bartender or manager) selects the home button 1010, a nominal configuration setting is provided and established between the channels tuned and the programs provided to the televisions in the facility or establishment. The home button 1010 may be useful in establishing a nominal configuration for the facility, such as when the facility opens every day. An exemplary nominal configuration, after selecting the home button 1010, is shown for the televisions in the left side portion of main screen 1000.

Figure 11:
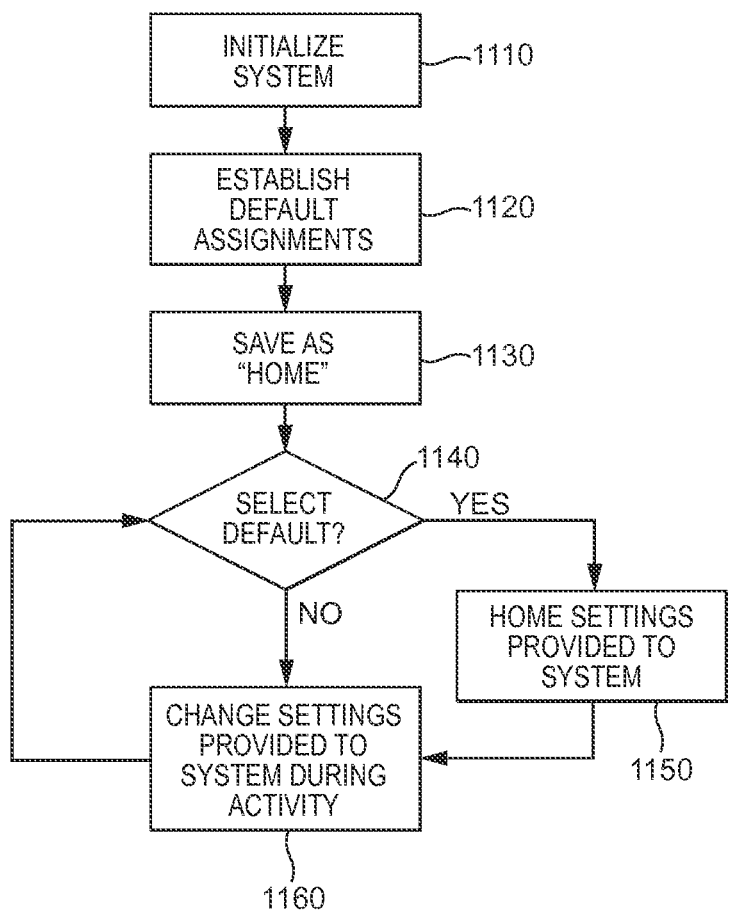
FIG. 11 is a flow chart of an exemplary process for establishing the signals provided to multiple display devices in accordance with an embodiment of the disclosure.

Turning to FIG. 11, an embodiment of flow diagram illustrating a process 1100 for generating a home or default operating configuration using principles of the present disclosure is shown. One or more steps in process 1100 may be incorporated in QAM modulator 60 described in FIG. 3. Further, one or more steps of process 1100 may be incorporated into one or more blocks for the content distribution system 10 described in FIG. 1 or content distribution system 15 described in FIG. 2.

At step 1110, the system is initialized. When the content distribution system is initially turned on, the system may initialize using a blank or empty configuration. In other words, no channels or programs are supplied to any of the televisions. At step 1120, the user (e.g., bartender or manager) begins configuring a nominal setup. The nominal setup is configured by selecting channels or programs and assigning (e.g., dragging and dropping) the channels or programs to one or more televisions, as described above. Once this initial configuration is made, at step 1120, then, at step 1130, the configuration is saved as the default or home setting. Saving the default or home configuration, at step 1130, may be done by a right click feature, or as part of the setup menu.

During activity, such as during the time the facility or establishment is in use, various settings will be changed and new channels or programs may be provided to different televisions. However, the user always maintains the option to return to a default or home configuration with the selection of default or home configuration (e.g., selecting the Home button 1010 in FIG. 10). If at step 1140, the user selects the default or home configuration, then, at step 1150, the saved settings are restored and all TV programming is reset. If, at step 1140, the default or home configuration is not selected, then, at step 1160, the operation of the system continues in normal mode with new programming being selected during normal use. Process 1100, in conjunction with use of the Home button 1010 in FIG. 10, may be used on subsequent initialization and start up, such as on the following day, even if the content distribution system is configured to start up or save the last settings before power down.

Although not shown, multiple default configurations in addition to the Home setting could be generated and saved. Multiple default configurations may be useful in order to quickly establish special program settings, such as for viewing special events. The procedure for establishing an additional configuration is the same as above. The configuration is saved and may be given a specific identification name. Configurations may also similarly be removed when no longer needed or used. In one example, a set of configurations may be created for particular sporting events, such as NCAA Basketball, NASCAR, Baseball, NBA, College Football Bowls, Olympics, and the like. Further, the configurations may be time sensitive. In other words, a particular configuration may be created for the US Open golf championships that is used only during the time of the event.

Each of the configurations may be provided to the user as a set of tabs on the upper left portion of the user interface screen or as a drop down menu. Further, the tabs or menu listings for the configurations may include a "preview" mode. The preview mode allows the configuration to be viewed prior to selection. As another feature, the generation of the home configuration or a new configuration, as described in process 1100, may be done in an offline mode allowing generation of the new configuration without interrupting the current operation of the system.

The user interface main screen 1000 in FIG. 10 also includes a round button 1020 located next to the Home button 1010. Button 1020 allows for all settings (e.g., channels provided to the televisions) to be cleared when the button is activated. The ability to clear all settings may be important in order to confirm proper operation of the content distribution system. An additional button 1030, shown as a trashcan and located in the upper middle of the user interface, allows for one or more of the individual television settings to be cleared. It is important to note that each of these buttons may be used only to affect the channels and/or programs provided to the televisions and may not actually affect the channels currently tuned by tuning resources in the content distribution system (e.g., multichannel receiver 30 in FIG. 1). Further, these buttons are not intended to change the display of the channels available on the right side portion of the user interface as shown in main screen 1000.

Figure 12:
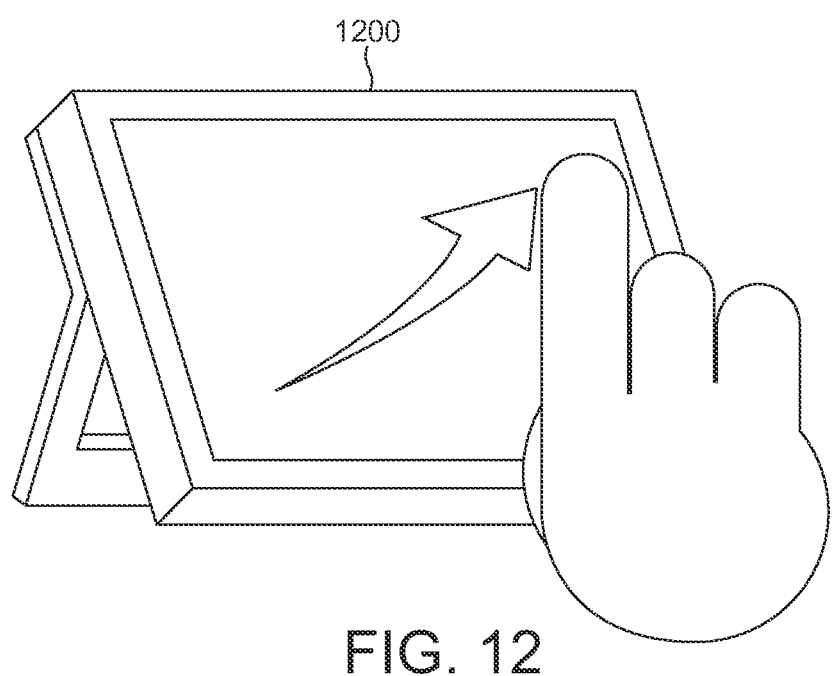
FIG. 12 is an exemplary touch panel device in accordance with an embodiment of the present disclosure.

Turning now to FIG. 12, an exemplary touch panel device 1200 according to one or more embodiments of the present disclosure is shown. Touch panel device 1200 may be included as part of PC 100 shown in FIG. 1 and FIG. 2. Touch panel device 1200 may also be separately connected to a content distribution system (e.g., system 10 in FIG. 1 or system 15 in FIG. 2) through a wired or wireless communication interface. The touch panel device 1200 may also be a stand-alone device (e.g., a tablet or touch display monitor). Touch panel device 1200 may further include an input circuit for receiving commands and a controller for processing the commands as well as display signals.

The touch panel device 1200 allows operation and control of a content distribution system based on hand movements, or gestures, and other touch actions translated through the panel into commands for the content distribution system. In a preferred embodiment, touch panel device 1200 implements some or all of the steps in process 800 described in FIG. 8. Touch panel device 1200 may implement a user interface using screens and controls that are the same or similar to the screen shots shown in FIG. 6, FIG. 7, and FIG. 9. Touch panel device 1200 may also implement some or all of the steps in process 1100 described in FIG. 11 along with a user interface similar to that shown in FIG. 10. In other embodiments, the touch panel device 1200 may simply serve as a navigational tool to navigate and enter commands associated with control of the content distribution system.

Although the above descriptions have focused on a facility management system for bars, casinos, restaurants, and the like, such a system and user interface can be easily adapted to home use, particularly in new whole home distribution systems employing a plurality of televisions and controlled through a central device that includes a plurality of tuners and a distribution network.

The disclosure described above is directed at the problem of allocating the resources in a centralized content delivery and distribution system. One or more of the embodiments receive requests for content to be tuned and delivered to one or more televisions and identifies any potential viewing conflicts as well as potential options for changes. One or more of the embodiments include a user interface that provides an indication that the content delivery system does not have an additional receiving resource for the latest channel request and further displays, in a graphical manner, the potential re-allocation options, including a prioritization based on the number of televisions viewing each program as well as a display of which televisions are viewing the various programs. The embodiments have advantages over previous approaches when operating on multiple televisions simultaneously. Further, the present embodiments address problems associated with limited tuning resource by identifying and displaying a prioritization based on how many televisions are viewing the current programming and further permits the user to choose a solution based on the locations of the televisions currently viewing the programs.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for controlling content being provided to a plurality of devices, the method comprising:
   receiving, at an input circuit, a request to change a program being provided to a first device in the plurality of devices to a requested program;
   determining, by a controller coupled to the input circuit, if the requested change requires changing the program provided to at least one second device in the plurality of devices;
   arranging, by the controller, a list of programs currently provided to the plurality of devices into a list of entries if the requested change requires changing the program to the at least one second device, wherein each entry in the list of entries includes a subset of the plurality of devices being provided the same program;
   outputting for display, by the controller, the list of entries if the requested change requires changing the program to the at least one second device,
   receiving, by the controller, an input selecting an entry from the list of entries; and
   changing, by the controller, the program provided to the first device and the subset of the plurality of devices in the selected entry to the requested program.

2. The method of claim 1, wherein a first entry in the list of entries includes all devices of the plurality of devices that are being provided the same program being provided to the first device.

3. The method of claim 2, wherein each entry following the first entry in the list of entries includes all devices that are provided with a program other than the program provided to the first device.

4. The method of claim 3, wherein each entry subsequent to the second entry in the list of entries is ordered such that the number of devices in each entry subsequent to the second entry is unchanged or decreasing.

5. The method of claim 1, further comprising:
   generating, by the controller, a list of each of the plurality of devices and a program that is provided to each of the plurality of devices; and
   storing, by the controller, the list as a configuration, the configuration being recalled for outputting at a later time based on a request by the user.

6. The method of claim 1, wherein the programs are video programs provided through a network and the devices are televisions.

7. The method of claim 1, wherein the method is used as part of a user interface for controlling a content distribution system.

8. The method of claim 1, further comprising outputting for display, by the controller, a first plurality of visual elements associated with programs that are available for display on the plurality of devices and a second plurality of visual elements associated with the plurality of devices, each of the visual elements including an indication of a current program displayed on each of the plurality of devices.

9. The method of claim 1, wherein the input circuit and controller are disposed in a tablet with a touch screen.

10. An apparatus for controlling content being provided to a plurality of devices, the apparatus comprising:
means for receiving a request to change a program being provided to a first device in the plurality of devices to a requested program;
means for determining if the requested change requires changing the program provided to at least one second device in the plurality of devices;
means for arranging a list of programs currently provided to the plurality of devices into a list of entries if the requested change requires changing the program to the at least one second device, wherein each entry in the list of entries includes a subset of the plurality of devices being provided the same program;
means for outputting for display the list of entries if the requested change requires changing the program to the at least one second device,
means for receiving an input selecting an entry from the list of entries; and
means for changing the program provided to the first device and the subset of the plurality of devices in the selected entry to the requested program.

11. The apparatus of claim 10, wherein a first entry in the list of entries includes all devices of the plurality of devices that are being provided the same program being provided to the first device.

12. The apparatus of claim 11, wherein each entry following the first entry in the list of entries includes all devices that are provided with a program other than the program provided to the first device.

13. The apparatus of claim 12, wherein each entry subsequent to the second entry in the list of entries is ordered such that the number of devices in each entry subsequent to the second entry is unchanged or decreasing.

14. The apparatus of claim 10, further comprising:
means for generating a list of each of the plurality of devices and a program that is provided to each of the plurality of devices; and
means for storing the list as a configuration, the configuration being recalled for outputting at a later time based on a request by the user.

15. The apparatus of claim 10, wherein the program are video programs provided through a network and the devices are televisions.

16. The apparatus of claim 10, further comprising means for outputting for display a first plurality of visual elements associated with programs that are available for display on the plurality of devices and a second plurality of visual elements associated with the plurality of devices, each of the visual elements including an indication of a current program displayed on each of the plurality of devices.

17. The apparatus of claim 10, wherein the apparatus is a tablet with a touch screen.

18. The apparatus of claim 10, wherein the apparatus is used as part of a user interface for controlling a content distribution system.

19. An apparatus for controlling content being provided to a plurality of devices, the apparatus comprising:
an input circuit that receives a request to change a program being provided to a first device in the plurality of devices to a requested program;
a controller coupled to the input circuit, the controller:
determining if the requested change requires changing the program provided to at least one second device in the plurality of devices;
arranging a list of programs currently provided to the plurality of devices into a list of entries if the requested change requires changing the program to the at least one second device, wherein each entry in the list of entries includes a subset of the plurality of devices being provided the same program;
outputting for display the list of entries if the requested change requires changing the program to the at least one second device,
receiving an input selecting an entry from the list of entries; and
changing the program provided to the first device and the subset of the plurality of devices in the selected entry to the requested program.

20. The apparatus of claim 19, wherein the first entry in the list of entries includes all devices of the plurality of devices that are being provided the same program being provided to the first device.

21. The apparatus of claim 20, wherein each entry following the first entry in the list of entries includes all devices that are provided with a program other than the program provided to the first device.

22. The apparatus of claim 21, wherein each entry subsequent to the second entry in the list of entries is ordered such that the number of devices in each entry subsequent to the second entry is unchanged or decreasing.

23. The apparatus of claim 19, wherein the apparatus is a tablet with a touch screen.

24. The apparatus of claim 19, wherein the controller outputs for display a first plurality of visual elements associated with programs that are available for display on the plurality of devices and a second plurality of visual elements associated with the plurality of devices, each of the visual elements including an indication of a current program displayed on each of the plurality of devices.

25. The apparatus of claim 19, wherein the controller generates a list of each of the plurality of devices and a program that is provided to each of the plurality of devices and stores the list as a configuration, the configuration being recalled for outputting at a later time based on a request by the user.

26. The apparatus of claim 19, wherein the programs are video program provided through a network and the devices are televisions.

27. The apparatus of claim 19, wherein the apparatus is used as part of a user interface for controlling a content distribution system.

* * * * *